US006457142B1

(12) United States Patent
Klemm et al.

(10) Patent No.: US 6,457,142 B1
(45) Date of Patent: Sep. 24, 2002

(54) METHOD AND APPARATUS FOR TARGET APPLICATION PROGRAM SUPERVISION

(75) Inventors: Reinhard P. Klemm, North Plainfield; Navjot Singh, Morristown, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/430,161

(22) Filed: Oct. 29, 1999

(51) Int. Cl.[7] ................................................ H02H 3/05
(52) U.S. Cl. .......................................... 714/38; 714/47
(58) Field of Search .............................. 714/38, 26, 27, 714/39, 47; 702/188

(56) References Cited

U.S. PATENT DOCUMENTS 5,528,753 A * 6/1996 Fortin ........................... 714/38
6,026,236 A * 2/2000 Fortin et al. ................... 714/38

OTHER PUBLICATIONS

Yennun Huang et al. "NT–SwiFT: Software Implemented Fault Tolerance on Windows NT", *In Proceedings of the 2nd USENIX Windows NT Symposium*, Seattle, WA, USA, Aug. 1998.
White Paper,"MuTek BugTrapper, The complete Solution for Remote Troubleshooting", MuTek Solutions Ltd., 1998.
John G. P. Barnes et al., "Execution Monitoring and Debugging Tool For ADA Using Relational Algebra", *Proceedins, of the Ada International Conference 1985*,pp. 109–123, 1985.
B. Plattner, "Real–Time Execution Monitoring", *IEEE Transactions on Software Engineering*, vol. SE–10, No. 6, pp. 756–764, Nov. 1984.

* cited by examiner

*Primary Examiner*—Robert Beausoleil
*Assistant Examiner*—Marc Duncan
(74) *Attorney, Agent, or Firm*—Thomas Stafford

(57) ABSTRACT

A fault monitoring, performance monitoring and fault tolerance apparatus and method for target target application programs is realized in an application supervisor by employing a supervisor agent, modified application programming interfaces (APIs), a generic application wrapper and a shell script that operate interactively to detect and automatically resolve reliability and performance problems occurring in executing the target application program. This is realized, in accordance with the invention, without the need to access, modify or have knowledge of the source code of the target application program to be supervised. In a specific embodiment of the invention, Java™ programming language target application programs are supervised. This is realized by employing the supervisor agent that attaches to a Java virtual machine through two virtual machine native interfaces. One interface is the Java Virtual Machine Profiler Interface (JVMPI) and the other is the Java Native Interface (JNI).

51 Claims, 8 Drawing Sheets

FIG. 4 OVERALL JAS EXECUTION

ABNORMAL THREAD TERMINATION

PERIODIC THREAD CHECK

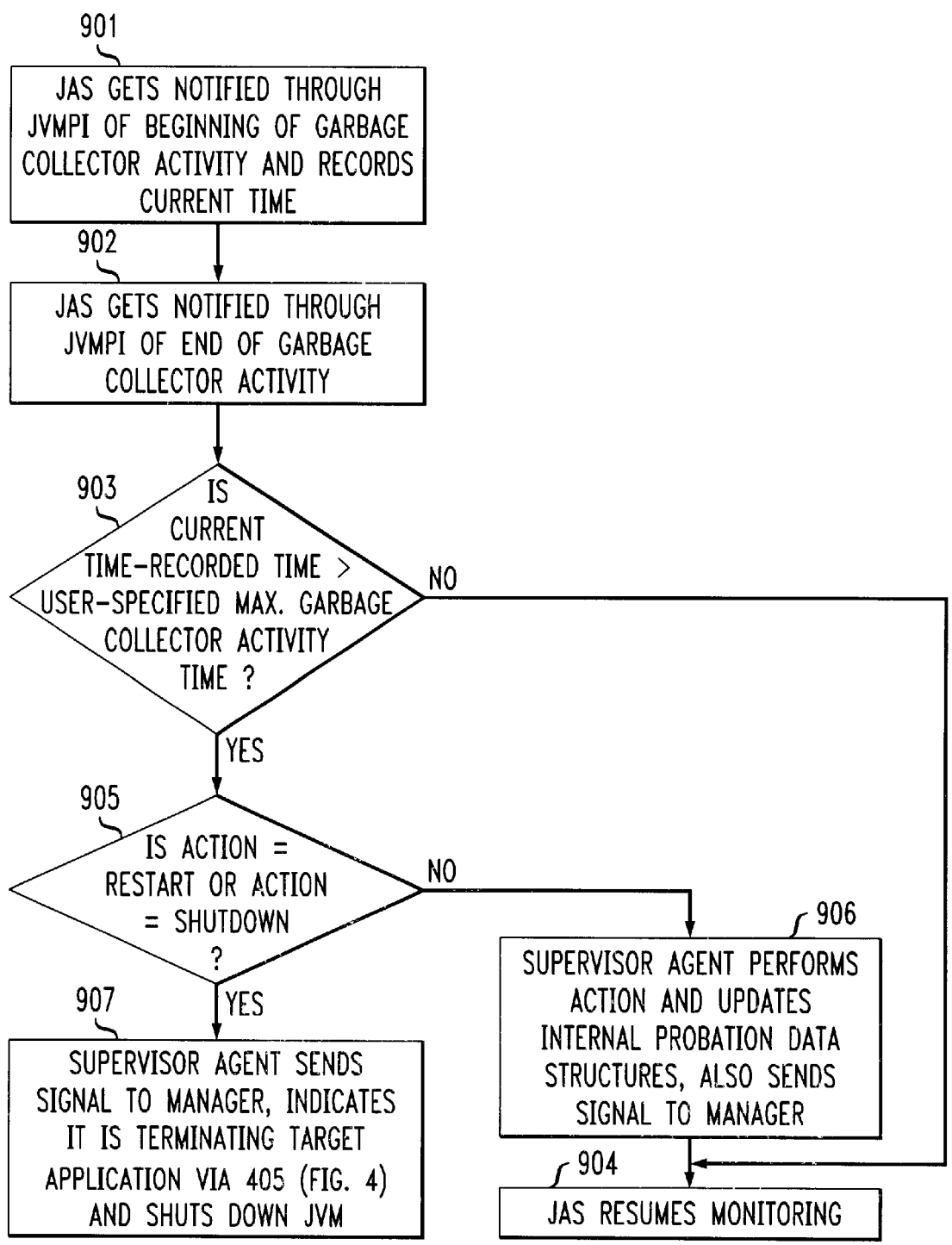

METHOD AND APPARATUS FOR TARGET APPLICATION PROGRAM SUPERVISION

TECHNICAL FIELD

This invention relates to program reliability, performance monitoring and problem resolution and, more particularly, to target application program supervision.

BACKGROUND OF THE INVENTION

A number of prior software application supervision, i.e., program monitoring, apparatus and techniques are known in the art. However, these prior apparatus and techniques where limited to detecting and recovering from so-called process hangs and crashes. There also are prior known arrangements that support implementation of internal and external application program supervisors. Prior systems that support implementation of an internal application supervisor require that the target application program be modified, either by modifying the source code or by modifying the executable code. Similarly, prior systems that support implementation of an external application supervisor require extensive modifications to and recompilation of the source code. This is not only time consuming and difficult, but often impossible to implement because the source code is typically not available to a customer.

SUMMARY OF THE INVENTION

Problems and limitations of prior known fault monitoring, performance monitoring and fault tolerance apparatus and method for target application programs are overcome in an application supervisor by employing a supervisor agent, modified application programming interfaces (APIs), a generic application wrapper and a shell script that operate interactively to detect and automatically resolve reliability and performance problems occurring in executing the target application program. This is realized, in accordance with the invention, without the need to access, modify or have knowledge of the source code of the target application program to be supervised.

In a specific embodiment of the invention, Java™ programming language applications are supervised. This is realized by employing the supervisor agent that attaches to a Java virtual machine through two virtual machine native interfaces. One interface is the Java Virtual Machine Profiler Interface (JVMPI) and the other is the Java Native Interface (JNI). In conjunction with the JVMPI and JNI, the supervisor agent can detect and respond, i.e., resolve prescribed events in an executing target application program. Other events that cannot be monitored through the JVMPI and JNI are propagated to the supervisor agent through a set of modified Java API classes. That is, the target application program is accessed through the modified API classes. In this manner, JAS is able to monitor events during the execution of the target application program. To start up the supervised target application program and process a configuration file, the application supervisor of this invention employs a generic application wrapper and a shell script.

It is important that JAS be easily configured, and still be flexible and powerful in order to supervise specific target application programs. This is realized by configuring JAS by parameterizing a set of policy templates in a configuration file. Each policy template is associated with a specific aspect of reliability or performance of either the entire target application program or a subclass of its threads or objects. Once a policy template has been parameterized, it becomes a policy that specifies what behavior the application supervisor should treat as an anomaly and how it should react to it once it is detected.

In another embodiment of the invention, events and actions of the executing target application program can be visualized in a remote manager that is connected to the supervisor agent via a customized protocol that uses a TCP/IP (transmission control protocol/internet protocol) transport mechanism. The remote manager may also request status information on the supervised target application program, as well as, initiate target application program supervision actions on its own.

A technical advantage of the invention is that it can detect and resolve an extensive range of reliability, as well as, performance problems including a complete target program process crash.

BRIEF DESCRIPTION OF THE DRAWING

FIG. 9 is a flow chart illustrating the steps in an example flow for a performance problem process.

DETAILED DESCRIPTION

Figure 1:
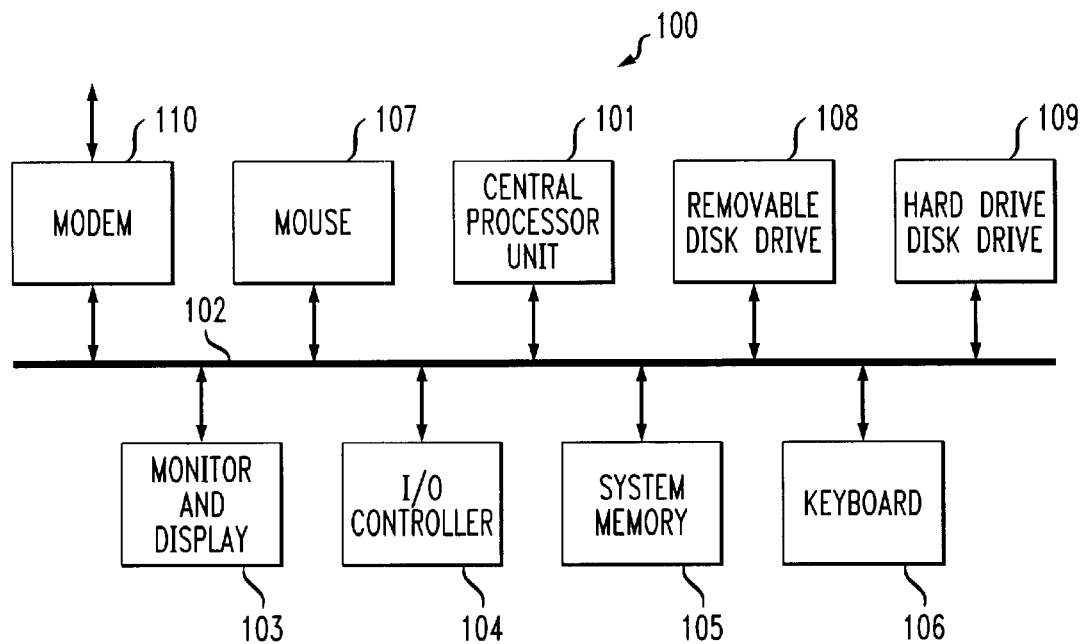
FIG. 1 shows, in simplified block diagram form, details of a personal computer or work station on which the invention may be practiced.

The Java™ programming language is increasingly being used in the implementation of programs that used to be the domain of more traditional programming languages such as C and C++. Many of these programs, in particular servers, have stringent availability, reliability, and performance requirements. The Java Application Supervisor (JAS) is a generic software system that attaches to any given Java virtual machine and supervises the execution of the running program, i.e., JAS automatically detects and resolves many reliability and performance problems according to the user's specifications. JAS reduces and in many cases eliminates the need for the program specific, time intensive and effort intensive implementation of mechanisms that monitor and handle reliability and performance problems. JAS does not require source code modifications or recompilation of the supervised Java program. Thus, JAS can be used to enhance the availability of Java server programs and decrease the risk of performance degradation with very little effort on the developer's part. JAS is lightweight in the sense that it imposes very little execution time and memory overheads on the supervised program.

Introduction

Quite often and for a variety of reasons, performance and reliability problems materialize only after a program has been deployed to the user. Thus, a program with stringent performance and reliability requirements ideally comes with built in mechanisms that detect performance and reliability problems at runtime ("on line"). The mechanisms may alert a programmed or human supervisor, or they may automatically attempt to resolve the problems. Such mechanisms can also be used to record reliability and performance trouble spots in the program that can then serve during a software maintenance phase as the basis for program improvements. Let us call a collection of such mechanisms an application supervisor. Let us also call the process of detecting and resolving performance and reliability problems during the execution of a target application program or supervised target application program supervision. If an application supervisor is an integral part of a target application program, we call it an internal application supervisor. If the supervisor is somehow attached to the supervised program in such a way that the latter can execute without the supervisor, i.e., if the supervisor is not an integral part of the supervised program, we call it an external application supervisor.

Target application program supervision is intended to detect performance and reliability problems that were overlooked or not anticipated during software testing and maintenance phases and that show up during the operational phase of the program. Usually, target application program supervision has to be lightweight in the sense that the execution time and memory overheads imposed on the target application program are small, i.e., the overhead of target application program supervision should not become an additional performance problem.

An application supervisor does not contribute to the functional purpose of the program. Therefore, many software projects avoid the time, expense, and required expertise associated with building an internal or external supervisor for the target application program in question. For this reason, we designed and built JAS (Java Application Supervisor). It is an external application supervisor that is reusable across all Java target application programs. JAS can be parameterized by the user for the specified target application and does not require changes to the target source code or bytecode or recompilation of the target, i.e., JAS is nonintrusive. While JAS cannot completely eliminate the need for target specific target application program supervision, it can very often reduce the time intensive and effort intensive implementation of mechanisms that monitor and handle reliability and performance problems. Since JAS is not part of a target application program, changes to the target application program supervision are easily made by reconfiguring JAS, and modifying the target application program does not necessitate any code changes in the application supervisor. Moreover, JAS can very quickly detect problems and, if necessary, restart the target application program. If the target application program is a server, this amounts to a brief interruption of the services rendered after which the detected problem usually disappears for a certain time. Hence, JAS can significantly improve the availability and long-term performance of the target application program.

It is important that configuring JAS is simple, yet flexible and powerful, or else JAS might not be more convenient to use than it would be to program a customized application supervisor for a specific target. JAS is configured by parameterizing a set of policy templates in a configuration file. Each policy template is associated with a specific aspect of reliability or performance of the entire target application program or a subclass of its threads or objects. Once a policy template has been parameterized, it becomes a policy that specifies what behavior JAS should treat as an anomaly and how to react to it once it has been detected. To understand the following examples, notice that a remote manager can be attached to JAS that can visualize some aspects of the state of the supervised target application program and the detected problems. An example of a reliability-related policy is:

Notify a remote manager 205 (FIG. 2) whenever a thread of class ClientRequestHandler dies abnormally. Restart target application program if more than 5 threads of class ClientRequestHandler die abnormally within 90000 ms.

The corresponding JAS policy would be

ClientRequestHandler abnormalThreadDeath 5 90000 notify restart

Abnormal thread death is defined as a thread stop due to an uncaught exception such as a NullPointerException. An example of a performance related policy is:

If more than 250 threads of class PrefetchURL are executing concurrently suspend all newly spawned threads. Notify remote manager if this happens more than 10 times within 3600000 ms.

The corresponding JAS policy would be

PrefetchURL threadlimit 250 10 3600000 suspend notify

JAS can be of service even if the user does not have knowledge of the internal structure of the target application program. For example, the user can almost always assume that an uncaught exception in a thread, leading to the immediate death of the thread, constitutes a software failure and warrants some action such as restarting the target application program. Similarly, if the user knows the maximum execution time of the target application program and the target exceeds this time, it is safe to assume a software failure that should result in an action that JAS can take. However, the more the user is familiar with the internals of the target application program the more the user can tailor the JAS configuration and, thus, the more precise the target application program supervision can be.

JAS Features

JAS is a so called lightweight external supervisor for Java target application programs. Its problem detection and resolution capabilities cover performance and reliability aspects of the target application program and are completely transparent to the target application program. The current JAS implementation can supervise any Java application program that fulfills all of the following conditions:

Since JAS adds a thread to the supervised target application program, the target application program may not make its functionality dependent on the total number of threads in its address space.

The target application program does not change its functionality depending on the size or number of Java API (application programming interface) class files.

It makes no assumptions about the order in which threads are scheduled or about absolute times for the execution of code, (well engineered Java programs should not do this anyway).

It does not change a set of Java API classes. Few Java programs change API classes.

For JAS to detect a Java exception, the target application program has to either throw the exception explicitly via a throw exception statement or it has to catch the exception and invoke a process on the exception object such as to Strin ( ).

The current implementation of JAS can detect at least the following performance related events, among others, in the target application program:

target application program does not terminate within expected time;
  thread does not terminate within expected time;
  garbage collector runs too often;
  garbage collector runs for too long;
  number of threads exceeds threshold.

At least the following reliability related events, among others, can be detected by the current JAS implementation:

virtual machine shutdown;
  number of threads is illegal, e.g., spawning the same thread more than once can indicate a programming bug;
  hung target application program, i.e., target application program does not terminate within expected time;
  hung thread, i.e., thread does not terminate within expected time;
  thread terminates, but is not supposed to terminate, i.e., this is a thread that runs forever;
  target application program exits with System.exit;
  thread terminates due to an uncaught exception raised either by the virtual machine or explicitly by the target application program;
  exception thrown, and caught by the target application program.

The Java equivalent of a C/C++ application crash is usually a thread or target application program termination due to an uncaught exception. Some Java programs also catch a variety of exceptions but do not deal with them other than printing or logging the exception, thus leaving the target application program in an illegal state. JAS can detect exceptions whether they are handled by the target application program or not. In the former case, JAS allows supplementing the exception handler in the target application program with additional functionality such as notifying a remote manager and logging of the exception by the manager. In particular, JAS can detect the following exceptions indicating a fatal situation encountered by the virtual machine due to an internal error or due to resource limitations:

OutOfMemoryError;
  StackOverflowError;
  InternalError;
  VirtualMachineError;
  UnknownError.

Exceptions can also result from various bugs in the target application program and many bugs will result in Java exceptions. Examples of such exceptions are:

NullPointerException;
  ArithmeticException;
  IllegalArgumentException;
  NumberFormatException;
  ArrayIndexOutOfBoundsException;
  SecurityException.

Another class of reliability problems that JAS can detect is the erroneous input of classes to the Java virtual machine resulting in an exception. The following are examples of such exceptions:

ClassFornatError;
  LinkageError;
  NoSuchMethodError.

Currently, JAS can respond to detected problems in at least the following ways, among others:

ignore event;
  notify remote manager;
  suspend additionally spawned threads if the detected problem is a dangerously high number of threads in the target application program;
  restart target application program;
  quit target application program.

In addition to more fined-grained problem detection, JAS can also apply more fine-grained problem solution strategies, for example, as follows:

make a complex decision about whether to take any action and what action to take based on the exact nature of the problem and based on an optional user-supplied policy;
  execute actions in addition to program-specified exception handlers when exceptions are thrown;
  suspend additional thread creation if the number of threads has reached a user-specified threshold;
  reset variable values if a problem has been detected and variable value changes might lead to a partial or complete solution of the detected problem.

The remote manager 205 (FIG. 2) notification can be combined with every other action. For each event, JAS can trigger one of two different actions depending on whether the event has happened less or more often than a certain number of times during a user specified time window. For example, if there has been a problem with the time consumed by the garbage collector at most 5 times during the last 10 minutes, the manager could be notified. If this happened more than 5 times during the last 10 minutes, the target application program could be restarted. JAS will also periodically notify the manager of the absence of any problems and will convey some statistical information such as the current number of running threads, the current memory consumption, etc.

No source code or bytecode changes or recompilation of the target application program is necessary. Depending on the knowledge about target application program internals, ranging from no knowledge to complete knowledge, a JAS user can tailor the JAS configuration to varying degrees. A tool that is part of the JAS distribution generates a default configuration for the target application program that can be modified by the JAS user. A JAS configuration consists mainly of a sequence of policies that specify which actions to take upon which events. To keep JAS and JAS configurations simple and to reduce the execution time overhead that JAS imposes on the target application program, there is only a fixed set of events and actions that the user can choose from when specifying policies. Policies are static, i.e., cannot be changed at run time, and policies cannot be based on other policies. A more detailed description of policies in a JAS configuration is described below.

Figure 3:
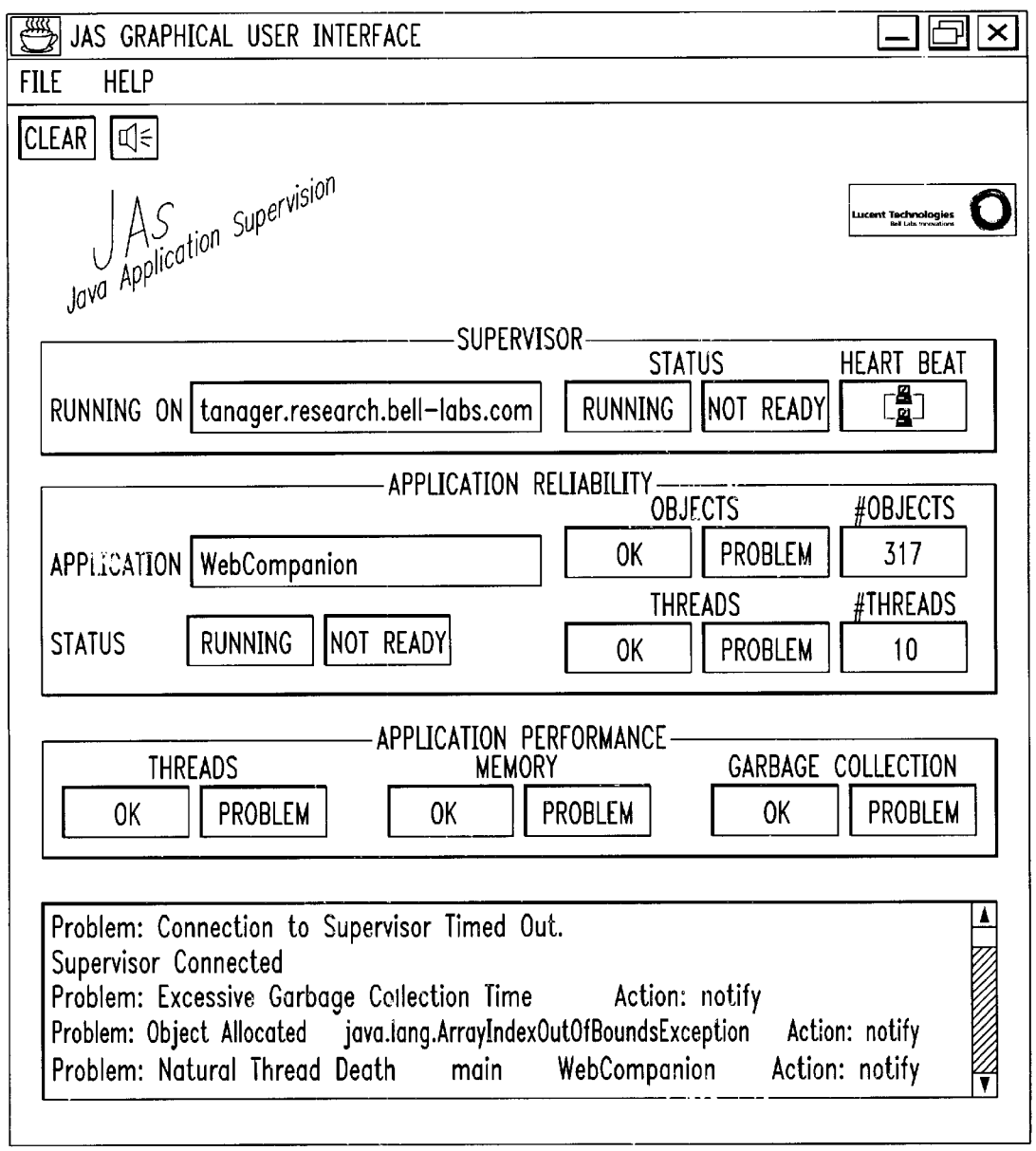
FIG. 3 pictorially depicts a display illustrating the default remote manager including an event log.

JAS communicates with a remote manager 205 via a customized UTF-8-based protocol on top of TCP/IP 206 in order to visualize events and actions and to receive instructions for actions that JAS ought to carry out. JAS and the remote manager 205 will attempt to reestablish the communication link between JAS and the remote manager 205 if it happens to get interrupted due to a failure of the communication subsystem, the remote manager, or the target application program. The standard JAS distribution contains a default graphical remote manager 205 that visualizes events and actions in JAS and logs every event, see for example FIG. 3 that pictorially depicts a display illustrating the default remote manager 205. The event log allows a user to pinpoint the nature of the detected problem and the time in milliseconds and location in the application of the problem occurrence. An excerpt from an event log is presented below.

Indeed, if more flexibility in specifying policies is needed than JAS configurations allow, a user will be able to program a customized manager that receives event notifications from JAS and instructs JAS to respond to events with actions. Relating events to actions can thus be done with an arbitrary level of complexity and is not subject to most of the JAS restrictions on policies.

Configuring JAS For a Target Application Program

Before using JAS for supervising a given target application program, a JAS user has to generate a JAS configuration for the target application program. A JAS configuration is an ASCII file containing a sequence of policy specifications and other information for JAS. A policy describes what action(s) to take if a specified event occurs. The user may generate a default configuration by applying a tool (configuration manager) contained in the JAS distribution to the set (or any subset) of class files comprising the target application program. To get the maximum benefit from JAS, the user should modify the default configuration to reflect the specifics of the target application program. Changing the default configuration is a very simple process as shown below.

A JAS configuration consists of three parts:
1. thread policy specifications;
2. system policy specifications;
3. manager specifications.

A sample configuration for JAS is shown below. It is for the target application program WebCompanion, a prefetching and caching Web proxy. This target application program also generated the event log shown below.

An example excerpt from a JAS event log showing the times when events occurred, the events, and actions taken is as follows:

0 supervisorRunning WebCompanion
411 applicationRunning notify
511 GcmaxTimeExceeded notify
1072  objectAllocatedjava.lang.Array-IndexOutOfBoundsException notify
1633 naturalThreadDeath main WebCompanion notify
18757 GCmaxTimeExceeded notify
20610 GCmaxTimeExceeded notify
23174 GCmaxTimeExceeded notify
35231 GCmaxTimeExceeded restart
0 supervisorRunning WebCompanion
331 applicationRunning
882 objectAllocated java.lang.ArrayIndexOutOfBoundsException notify
1152 naturalThreadDeath main WebCompanion notify
39307 abnormalThreadDeath Thread-4 FetchThread
   java.lang.NullPointerException
   at FatchThread.accessURL(Compiled Code)
   at FetchThread.run(Compiled Code)
   notify
49391 abnormalThreadDeath Thread-5 FetchThread
   java.lang.NullPointerException
   at HTMLdocs.loadNewDocument(Compiled Code)
   at FetchThread.complete(FetchThread java:204)
   at FetchThread.accessURL(Compiled Code)
   at FetchThread.run(Compiled Code)
   notify
102378 abnoralThreadDeath Thread-6 FetchThread
   java.lang.NullPointerException
   at FetchThread.accessURL(Compiled Code)
   at FetchThread.run(Compiled Code)
   restart Comments can be freely interspersed in the configuration file, and shown below, is the format of the configuration file as comments.

Thread Policy Specifications

Every thread in Java is generated from an object that is of class java.lang.Thread or a subclass thereof. In other words, every thread in Java can be naturally associated with a class that defines the behavior of the thread. For each such class, the JAS user may but does not have to add a set of policies to the JAS configuration. These policies determine what performance and reliability related events originating at a thread of the specified class JAS ought to consider a problem and how to respond to them. Currently, JAS allows the specification of at least five policies for each thread class. In the example shown below, there are policies for thread classes FetchThread, Prefetchthread, WebCompanion, and Watchdog. The five policies for each thread class concern the following events:

1. abnormal thread termination (caused by an uncaught exception);
2. normal thread termination (run method comes to a natural end);
3. expected completion time for thread has been exceeded (thread hung);
4. soft limit for number of threads has been exceeded (see below);
5. hard limit for number of threads has been exceeded (see below).

Each policy describes what action to trigger when JAS detects the specified event. There are two types of actions. The first type gets triggered as long as the total number of events of this type does not exceed a certain maximum within a specified time window (called probation). The second type of action gets triggered if the specified maximum number of events during the probation has been exceeded. The policy abnormalThreadDeath 2 300000 notify restart, for example, means "if more than 2 threads of the given class terminate abnormally within 300000 milliseconds, restart the entire target application program; every abnormal thread termination before that will result in the notification of the manager". The policy naturalThreadDeath 0 INFINITE quit quit means "if a thread of the given class terminates normally from the virtual machine point of view, quit the target application program" implying that either this thread is supposed to run forever but a bug might lead to thread termination, or the death of this thread also means the end of the target application program execution. Reaching a soft or hard limit on the number of threads can imply resource or performance penalties that the user would like to avoid. It can also mean that there is a bug in the program that causes more than an allowed number of threads to be spawned. In the former case, the specified action could be, for example, suspend which means that each thread that exceeds the given threshold is suspended until the total number of active threads has fallen below the threshold. In the latter case, the specified action could be, for example, to quit the target application program.

An example of a JAS configuration for WebCompanion is as follows:
FetchThread
  // abnormalThreadDeath  <maximum>_ <probation><beforeaction><afteraction>
  abnormalThreadDeath 2 300000 notify restart

```
//                              naturalThreadDeath
   <maximum><probation><beforeaction><afteraction>
naturalThreadDeath 0 INFINITE restart restart
//                          expectedCompletionTime
   <time><maximum><probation><beforeaction>
   <afteraction>expectedCompletionTime INFINITE INFI-
   NITE INFINITE none none
// softlimit <number><maximum><probation><before-
   action><afteraction>
softlimit INFINITE INFINITE INFINITE none none
// hardlimit <number><maximum><probation><before-
   action><afteraction>
hardlimit INFINITE INFINITE INFINITE none none
PrefetchThread
//    abnormalThreadDeath    <maximum>_
   <probation><beforeaction><afteraction>
abnormalThreadDeath 3 INFINITE notify restart
//                              naturalThreadDeath
   <maximum><probation><beforeaction><afteraction>
naturalThreadDeath 0 INFINITE restart restart
//                          expectedCompletionTime
   <time><maximum><probation><beforeaction>
   <afteraction>expectedCompletionTime INFINITE INFI-
   NITE INFINITE none none
// softlimit <number><maximum><probation><before-
   action><afteraction>
softlimit INFINITE INFINITE INFINITE none none
// ardlimit <number><maximum><probation><before-
   action><afteraction>
hardlimit INFINITE INFINITE INFINITE none none
WebCompanion
//    abnormalThreadDeath    <maximum>_
   <probation><beforeaction><afteraction>
abnormalThreadDeath 0 INFINITE notify restart
//                              naturalThreadDeath
   <maximum><probation><beforeaction><afteraction>
naturalThreadDeath 1 INFINITE none none
//                          expectedCompletionTime
   <time><maximum><probation><beforeaction>
   <afteraction>expectedCompletionTime 30000 1 restart
   restart
// softlimit <number><maximum><probation><before-
   action><afteraction>
softlimit 1 1 INFINITE none quit
// hardlimit <number><maximum><probation><before-
   action><afteraction>
hardlimit 2 1 INFINITE quit quit
Watchdog
//                              abnormalThreadDeath
   <maximum><probation><beforeaction><afteraction>
abnormalThreadDeath 0 INFINITE restart restart
//                              naturalThreadDeath
   <maximum><probation><beforeaction><afteraction>
naturalThreadDeath 0 INFINITE quit quit
//                          expectedCompletionTime
   <time><maximum><probation><beforeaction>
   <afteraction>expectedCompletionTime INFINITE INFI-
   NITE INFINITE none none
// softlimit <number><maximum><probation><before-
   action><afteraction>
softlimit 1 1 INFINITE none quit
// hardlimit <number><maximum><probation><before-
   action><afteraction>
hardlimit 2 1 INFINITE quit quit
System
// maxRestarts <number3>
maxRestarts 3
// systemExit <except>action>
systemExit 0 restart
// VMShutdown <action>
VMShutdown quit
// supervisorlntemalError <action>
supervisorlntemalError quit
// expectedCompletionTime <time><afteraction>
expectedCompletionTime INFINITE none
// softlimit <number><maximum><probation><before-
   action><afteraction>softlimit
INFINITE 1 1 none none
// hardlimit <number><maximum><probation><before-
   action><afteraction>hardlimit
INFINITE 1 1 none none
// GCmaxTime <time><maximum><probation><before-
   action><afteraction>
GCmaxTime 10 5 60000 notify restart
// GCmaxFrequency <time><maximum><probation>
   <beforeaction><afteraction>
GCmaxFrequency 150 10 60000 notify restart
// checklnterval <time>
cheekinterval 3000
// catchThrowableAllocations {
   [<throwableName><maximum><probation><action-
      before><actionafter>]* }
catchThrowableAllocations {
java.lang.ArrayIndexOutOfBoundsException 0 60000
   restart restart java.lang.OutOfMemoryError 3 INFI-
   NITE notify restart }
Manager
// hostName <hostname>
hostName eagle
portNumber <portNumber>
// portNumber 3333
// timeout <time>
timeout 3000
// maxAttempts <number3>
maxAttempts 25
```

JAS does not require a class used in a policy to be present or publicly accessible when JAS starts up. Policies can thus describe private inner classes and classes that the target application program potentially loads dynamically at a later time.

System Policy Specifications

System policies affect the entire target application program. Currently, JAS allows at least ten system policies regarding the following events:

1. the number of restarts triggered by JAS in response to detected problems has reached a limit (the action after the maximum number of restarts has been reached is to shut down the target application program and JAS);
2. the target application program has called System.exit (n) indicating a fatal error from which it cannot recover (usually, System.exit(0) implies a normal target application program termination and every other value for n indicates a fatal error; JAS lets the user specify which value for n to consider normal); this event also triggers a virtual machine shutdown;

3. virtual machine shutdown (either because the target application program has terminated or the virtual machine has encountered an internal fatal error);
4. JAS has encountered a fatal internal error that it cannot recover from;
5. the target application program has not terminated within the expected time and can therefore be considered hung;
6. the entire number of running threads in the target application program has exceeded the soft limit threshold (can override the thread specific soft limit depending on which number is lower);
7. the entire number of running threads in the target application program has exceeded the hard limit threshold (can override the thread specific hard limit depending on which number is lower);
8. contiguous garbage collection activity took longer than specified;
9. time between two subsequent garbage collector runs is below minimum time threshold;
10. an exception object (an object of class Throwable or one of its subclasses) was allocated or an exception handler called a method on an exception object (this means that an exception was thrown and possibly caught by the target application program). JAS performs a thread and target application program hung check in time intervals specified by the user. At the time of the check, JAS transmits the thread and target application program status (hung or not) to the remote manager. JAS broadcasts every detected event to the remote manager provided that the user did not direct JAS to ignore the event.

Manager Specification

The manager specification describes on which host the remote manager resides and under which TCP/IP port number. Furthermore, a TCP/IP socket operation timeout can be specified, as well as, the maximum number of reconnection attempts in case of a communication link breakdown between JAS and the remote manager. If, after this maximum number of reconnection attempts, the connection could not be reestablished, JAS will cease to broadcast information to the manager from that time on.

Preferred Embodiment

FIG. 1 shows, in simplified block diagram form, details of apparatus including an embodiment of the invention. Thus, shown is computer system 100 including central processor unit 101 interconnected via bus 102 with monitor and display 103, I/O controller 104, system memory 105, keyboard 106, mouse 107, removable disk drive 108, hard disk drive 109 and modem 110. Indeed, FIG. 1 illustrates but one arrangement that may be utilized in implementing an embodiment of the invention, and other similar arrangements, personal computers, workstations or the like, may be employed to equally practice one or more embodiments of the invention. Note that one or more databases, files, target application programs, etc. may be stored in system memory 105.

JAS Architecture

Figure 2:
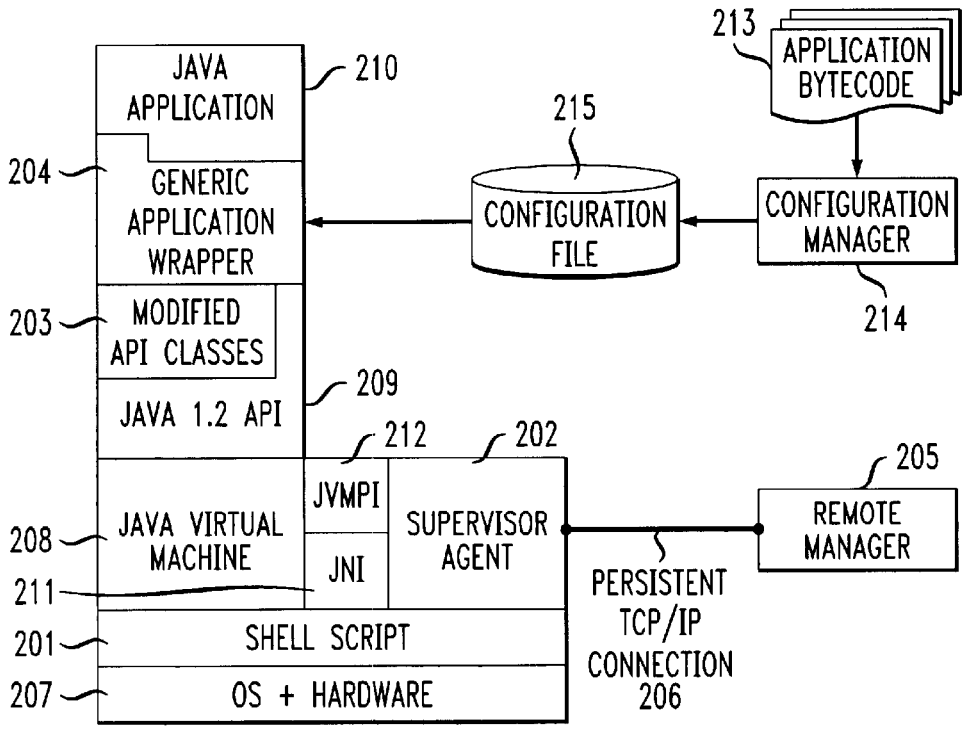
FIG. 2 shows, in simplified form, details of the Java application supervisor including an embodiment of the invention.

The JAS architecture is shown in FIG. 2. JAS is comprised of a shell script 201, a supervisor agent 202, a set of modified Java API (target application program programming interface) classes 203, a generic application wrapper 204, and optionally a default or customized remote manager 205 that resides on the same or a different machine and communicates with JAS via TCP/IP 206. Also included are OS and hardware unit 207, and in this example, Java Virtual Machine 208, Java 1.2 API 209, Java application 210, JNI 211, JVMPI 212, application byte code 213, configuration manager 214 and configuration file 215. Except for the remote manager 205 and the configuration manager 214, all JAS components are part of the target application program process. JAS is currently implemented for Microsoft Windows NT and Sun Solaris 2.6 but porting it to other platforms is simple since only the shell script and a small part of the supervisor agent need to be modified for different platforms. JAS requires Java virtual machine 208 that provides the same Java native interfaces (JNI 211) as JavaSoft's JDK 1.2 virtual machine 208. Using Java virtual machine 208 with a different set of native interfaces would require several modifications of the supervisor agent 202.

The shell script 201 starts up and shuts down JAS and the target application program and supplies the appropriate parameters to JAS and the Java virtual machine 208. The user issues the command Supervise followed by the name of the target application program and possibly target application program parameters to execute the shell script 201. Whenever the target application program shuts down, either because JAS forces it do so or because the target application program voluntarily shuts down or because the Java virtual machine 208 encountered an internal error, the application wrapper 204, a Java class, returns a number that is one more than the corresponding number when the target application program shut down the previous time. When the next restart of the target application program is triggered by the Java script 201, it passes this number to JAS. Once this number has reached the maximum number of restarts according to the JAS configuration, JAS will not restart the target application program again.

Figure 4:
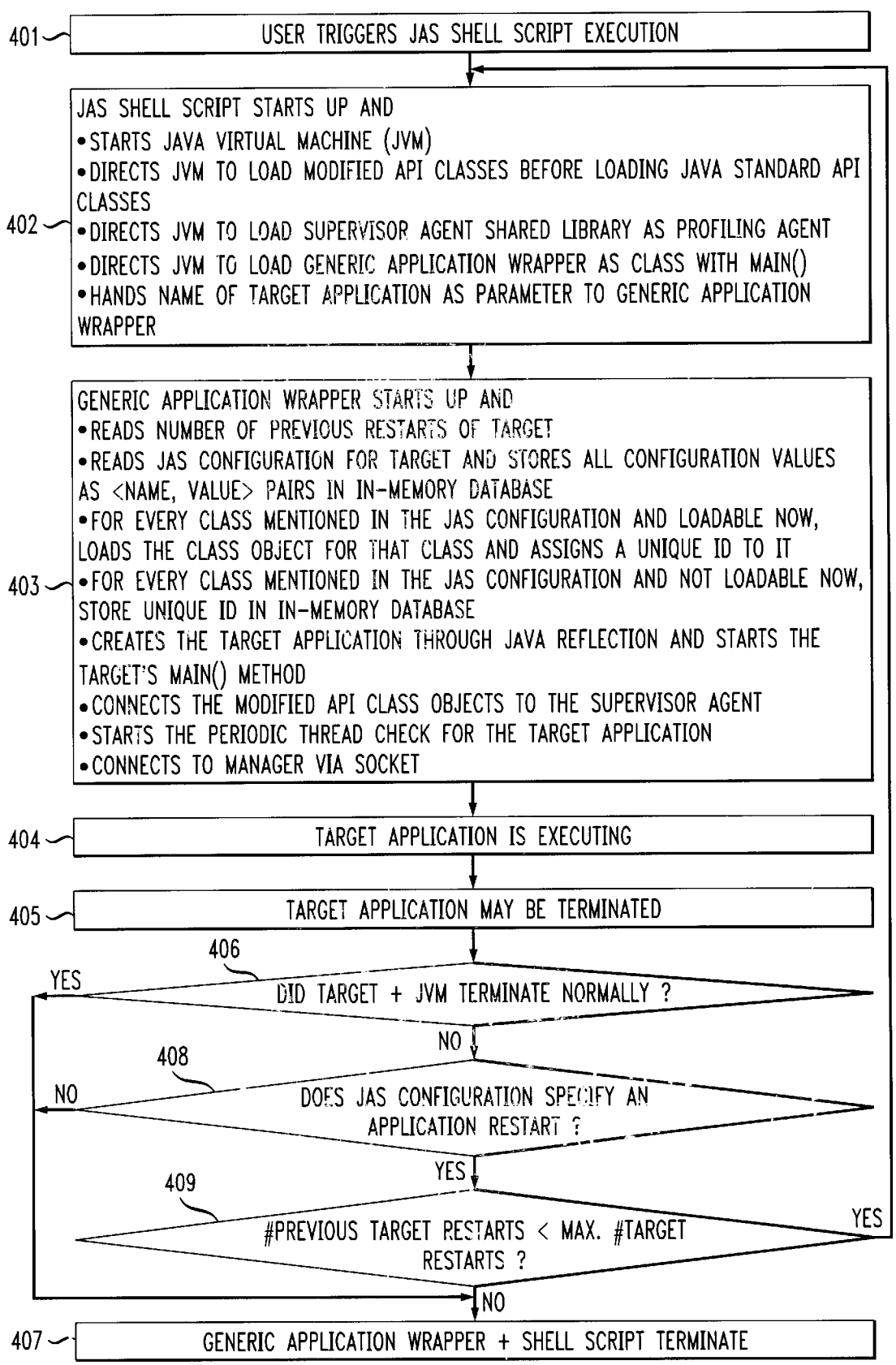
FIG. 4 is a flowchart illustrating the steps in an overall JAS execution process.

FIG. 4 is a flowchart illustrating the steps in an overall JAS execution process. The execution process is started in step 401 by a user triggering the JAS shell script 201 execution. Then, step 402 causes the JAS shell script 201 to start and also

- starts Java virtual machine 208 (JVM);
- directs JVM 208 to load API modified classes 203 before loading Java standard classes 209;
- directs JVM 208 to load supervisor agent 202 shared library as profiling agent;
- directs JVM 208 to load generic application wrapper 204 as class with main( );
- hands name of target application program as parameter to generic application wrapper 204.

Step 403 causes generic application wrapper 204 to start up. The generic wrapper 204

- reads number of previous restarts of target application program;
- reads JAS configuration for target application program and stores all configuration values as <name, value>pairs in memory database;
- for every class mentioned in the JAS configuration and loadable now, loads the class object for that class and assigns a unique ID to it;
- for every class mentioned in the JAS configuration and not loadable now, store the unique ID in in memory database;
- creates the target application program through Java reflection and starts the targets main( ) method;
- connects the modified API classes 203 objects to the supervisor agent 202;

starts the periodic thread check (FIG. 8) for the target application program;

connects to remote manager 205 via socket.

Step 404 indicates that the target application program is executing. Note that execution of the target application program was started in step 403. Step 405 indicates that the target application program may terminate. Note that in certain applications the target application program continues to execute. Whether it terminates is determined, in this example, in step 604 (FIG. 6), step 706 (FIG. 7), step 808 (FIG. 8) or step 907 (FIG. 9). Step 406 tests to determine if the target application program plus the JVM 208 terminate normally. If the test result in step 406 is YES, step 407 causes generic application wrapper 204 plus shell script 201 to terminate. If the test result in step 406 is NO, step 408 tests to determine if the JAS configuration specifies a restart. If the test result in step 408 is NO, control is transferred to step 407 and generic application wrapper 204 plus shell script 201 are caused to terminate. If the test result in step 408 is YES, step 409 tests to determine if the number of previous target application program restarts is less than the maximum (max.) number of target application program restarts. If the test result in step 409 is NO, control is transferred to step 407 and generic application wrapper 204 plus (+) shell script 201 are caused to terminate. If the test result in step 409 is YES, control is returned to step 402 and appropriate ones of steps 402 through 409 are iterated.

The tasks of the application wrapper are:

reading in and parsing the JAS configuration;

connecting the modified API to the supervisor agent;

transmitting policies from the configuration file to the supervisor agent;

loading the target application program;

starting the target application program;

starting the periodic check of JAS for hung threads and a hung target application program. The application wrapper 204 passes each policy from the configuration file 215 through calls to native methods to the supervisor agent 202, which stores the configuration parameters in objects that will be queried by the supervisor agent 202 during the execution of the target application program. Once the application wrapper 204 has finished its job, it essentially disappears and leaves the work to the supervisor agent 202. Unlike the supervisor agent 202, which is implemented in C++, the generic application wrapper 204 is written in Java. This has the advantage of exploiting all the advantages of the Java language without sacrificing much performance. The application wrapper 204 finishes its job so quickly that an implementation in C++ would have yielded at most minor performance enhancements.

The API classes 203 that JAS modifies are:

java.lang.Class;

java.lang.ClassLoader;

java.lang.Thread, java.lang.ThreadGroup;

java.lang.Runtime;

java.lang.Throwable.

JAS adds a new class SupervisorInterface to the java.lang package. The SupervisorInterface offers a set of native methods that provide a common interface for all events that the ThreadGroup, Throwable, and Runtime objects in the target application program want to forward to the supervisor agent. The modified ClassLoader and Class classes also assign a unique integer identification number (class ID) to each class that is listed in the JAS configuration. This includes inner classes and classes that the target application program might load at runtime over the network or from the local file system or that the target application program might create on the fly. Class IDs are used by the supervisor agent to quickly identify the class that JAS associates with a detected event. Such a class can be a thread class, an exception class, etc. The class associated with an event determines the action that follows the event occurrence. The class ID is an additional private integer field in class Class that is initialized by the ClassLoader for each Class object once it is loaded by the ClassLoader. Class also contains an additional static HashMap that maps all class names listed in the JAS configuration to class IDs. When the configuration is processed by JAS, it defines the class ID in the Class object of each class that is loadable by the virtual machine at that time. For any class loaded by the virtual machine at a later time, the HashMap in class Class is queried for the stored class ID and the class ID is then stored in the Class object. The querying really happens when the class ID is needed, i.e., when a performance or reliability problem has been detected and it has been associated with this class. We will explain later how the class ID is used to determine which policy applies to the class that is associated with an event relevant to JAS.

The supervisor agent 202 is a shared library and attaches to the Java virtual machine through a Java Virtual Machine Profiler Interface (JVMPI) 212 and a Java Native Interface (JNI) 211. The supervisor agent 202 is written in C++ and contains platform specific code for accessing the TCP/IP stack. We chose C++ over Java as the implementation language for the supervisor agent because the JVMPI and JNI are C/C++ interfaces and because maximum speed for the supervisor agent is a prerequisite for low overhead for JAS. Another reason for implementing the supervisor agent 202 in C++ is the fact that many JVMPI 212 event notifications are delivered with the garbage collector turned off. If the virtual machine attempts to execute Java code during a time when the garbage collector is forcefully turned off, the virtual machine can lock up.

The supervisor agent 202 first stores all the policies coming from the generic application wrapper. It then requests notifications from the JVMPI 212 of those events that the policies describe. These events form a subset of the following set of events:

thread start (necessary for checking soft and hard limits), thread termination, garbage collection start and end, virtual machine startup completed (necessary for JAS itself), virtual machine shutdown.

When these events occur, the JVMPI 212 will call methods in the supervisor agent 202 that have been associated with these events during the JVMPI 212 setup when JAS starts up. When a thread starts or terminates, the method called by the JVMPI 212 can retrieve only the thread name to identify which thread started or terminated, respectively. JAS, however, needs the thread class to be able to trigger the appropriate policy for thread start or termination, respectively. To convey the thread class to the supervisor agent 202, JAS modifies thread names during thread initialization in a way that is transparent to the target application program. The modification is comprised of a concatenation of the class ID of the thread class (see above) and the original thread name, separated by a /. The Thread.getname method was modified so that it returns only the portion after the / upon request from the target application program, thus making the thread name change transparent to the target application program. However, the supervisor agent can use the string prefix preceding the / to recognize the thread class. When a thread start or termination occurs, the supervisor agent method called by the JVMPI retrieves the thread class ID and uses it as a key into a hashtable that stores policies associated with classes, as specified in the JAS configuration.

Figure 5:
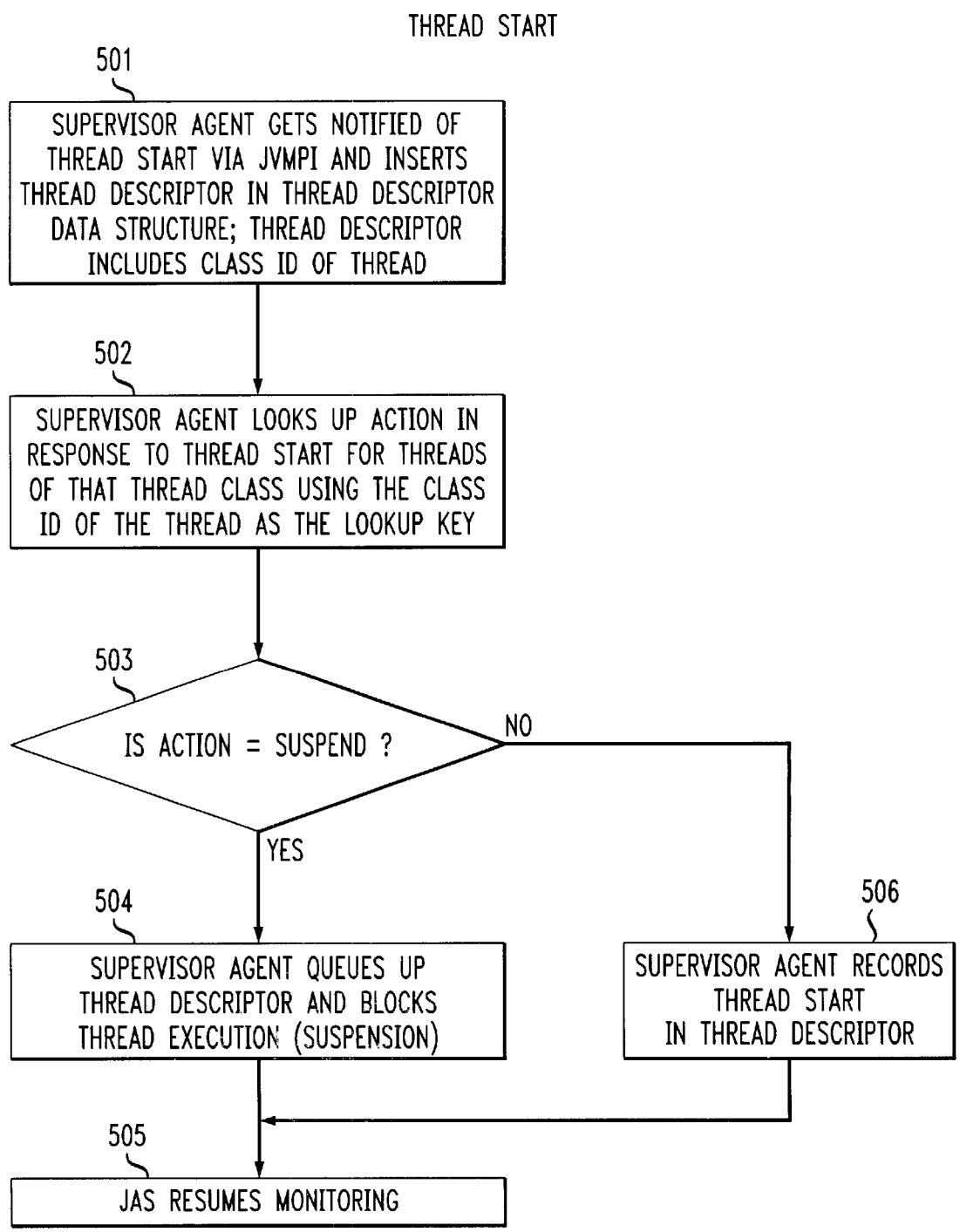
FIG. 5 is a flowchart illustrating the steps performed in the thread start process.

FIG. 5 is a flowchart illustrating the steps performed in the thread start method. The thread start method is begun via step 501, which causes the supervisor agent 202 to be notified of the thread start via JVMPI 212 and causes a thread descriptor to be inserted in a thread descriptor data structure. The thread descriptor includes the class ID of the thread. Step 502 causes the supervisor agent 202 to look up the action in response to thread start for threads of that thread class using the class ID of the thread as a lookup key. Then, step 503 tests to determine if the action equals suspend. If the test result in step 503 is YES, step 504 causes the supervisor agent 202 to queue up thread descriptor and block thread execution (suspension). Then, step 505 causes JAS to resume monitoring. If the test result in step 503 is NO, step 506 causes the supervisor agent 202 to record the thread start in the thread descriptor. Thereafter, control is transferred to step 505that causes JAS to resume monitoring.

Figure 6:
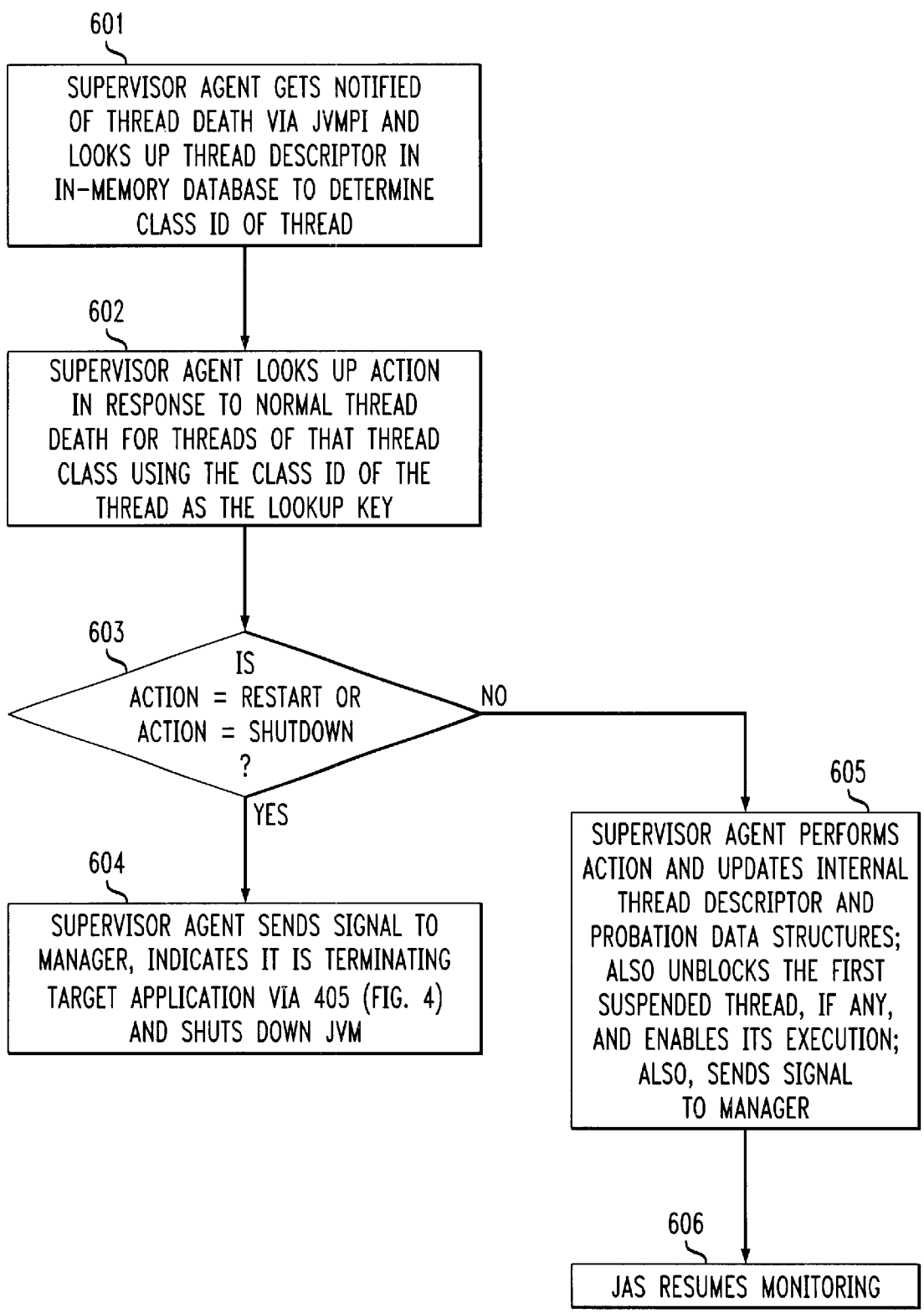
FIG. 6 is a flow chart illustrating the steps in the process for normal thread termination.

FIG. 6 is a flow chart illustrating the steps in the process for normal thread termination. The termination method is started in step 601 which causes the supervisor agent 202 to be notified of thread death via JVMPI 212 and looks up a thread descriptor in in memory database to determine the class ID of the thread. Then, step 602 causes supervisor agent 202 to look up an action in response to normal thread death for threads of that thread class using the class ID of the thread as the lookup key. Step 603 tests to determine if action equals restart or action equals shutdown. If the test result in step 603 is YES, step 604 causes the supervisor agent 202 to send a signal to the remote manager 205 indicating that it is shutting down the target application program via step 405 (FIG. 4) and shuts down JVM 211. If the test result in step 603 is NO, step 605 causes the supervisor agent 202 to perform the action and updates the internal thread descriptor and probation data structures, unblocks the first suspended thread, if any, and enables its execution and sends a signal to the remote manager 205. The signal sent to the manager 205, in this example, is a current status message, which may indicate how many threads are running, the machine the target application program is running on, any problems, etc. Thereafter, control is transferred to step 606, which causes JAS to resume monitoring.

Other events that are described in the policies are not handled by the JVMPI 212.

These events are:
   abnormal thread termination;
   a call to System.exit(n) from the target application program;
   throwing of an exception caught by the target application program.

Figure 7:
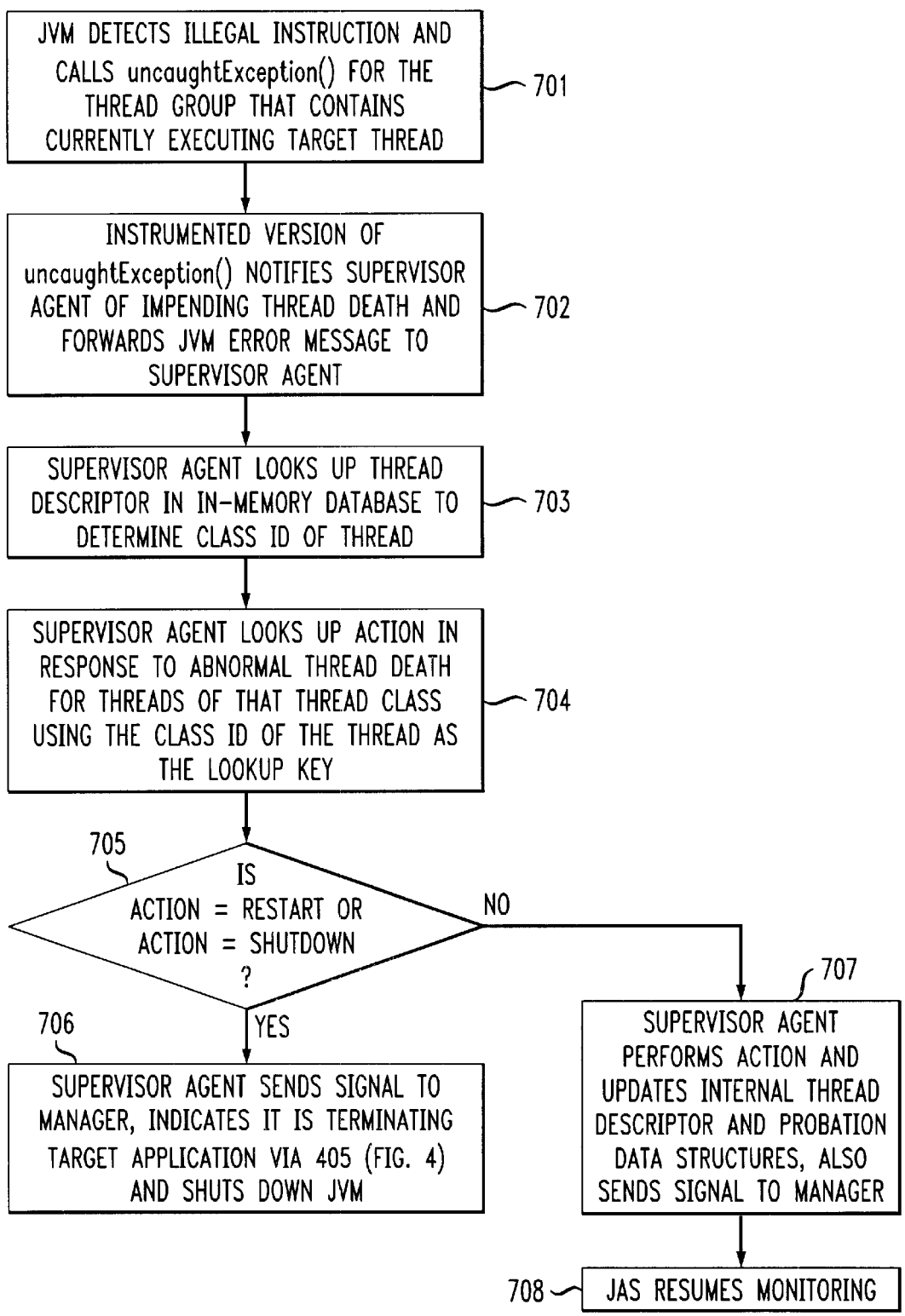
FIG. 7 is a flow chart illustrating steps in the process for abnormal thread termination.

FIG. 7 is a flow chart illustrating steps in the method for abnormal thread termination. The method starts in step 701 in which JVM 208 detects an illegal instruction and calls uncaughtException( ) for the thread group that contains the currently executing target thread. Step 702 causes an instrumented version of uncaughtException( ) to notify the supervisor agent 202 of an impending thread death and forwards an error message to the supervisor agent 202. Then step 703 causes supervisor agent 202 to look up the thread descriptor in in memory database to determine the class of the thread. Thereafter, step 704 causes the supervisor agent 202 to look up an action in response to the abnormal thread death for threads of that thread class using the class ID of the thread as the lookup key. Step 705 tests if the action equals restart or the action equals shutdown. If the test result in step 705 is YES, step 706 causes the supervisor agent 202 to send a message to the remote manager 205 indicating that it is shutting down the target application program via step 405 (FIG. 4) and shuts down JVM 208. If the test result in step 705 is NO, step 707 causes the supervisor agent 202 to perform the action, updates the internal thread descriptor and probation data structures, and also sends a message to remote manager 205. The signal sent to the manager 205, in this example, is a current status message, which may indicate how many threads are running, the machine the target application program is running on, any problems, etc. Additionally, if one or more threads has been suspended in step 504 (FIG. 5), step 707 causes resumption of execution of the thread that has been suspended for the longest time in step 504. Thereafter, control is transferred to step 708, which causes JAS to resume monitoring.

The modified API 203 classes java.lang.ThreadGroup, java.lang.Runtime, and java.lang.Throwable notify the supervisor agent 202 directly through the SupervisorInterface of these events once they occur. For this purpose, the appropriate methods in those classes have been modified by us. For example, the ThreadGroup.uncaughtException, Thread.init (for modifying the thread name as required by JAS, see above), and Runtime.exit methods have been modified. Whenever the supervisor agent 202 receives an event notification, either through the JVMPI 212 or from the modified API classes 203, the event is associated with the ID of a class. In the case of a thread related event, it is the ID of the class that the thread object belongs to. In the case of an exception, it is the ID of the class that the exception object belongs to. The supervisor agent 202 uses the class ID to retrieve the policies associated with this class and determines whether the event poses a problem as specified by a class policy and if so, what action to trigger. In the case of a remote manager 205 notification, the supervisor agent sends all pertinent information to the remote manager 205. After the expiration of all probation periods for an event defined as a problem by some policy, the supervisor agent sends another message to the remote manager 205. The default remote manager 205 uses this notification to reset the visual indication of a problem in the supervised target application program. As an example, the remote manager 205 will gray out the "Threads Problem" field and light up the "Threads OK" field once the probation periods of all threads have expired without new thread problems as defined by the thread class policies.

To notify the supervisor agent 202 of thrown or caught exceptions, we modified the Throwable class. The constructor of Throwable contains additional code that sends the class ID of the exception to the supervisor agent. If the Java virtual machine 208 throws an exception, the constructor is not being called. Therefore, we also modified all public Throwable methods with the exception of fillInStackTrace. The latter method is a native method in the JavaSoft JDK and, therefore, cannot be modified by us. If the target application program calls any of these methods in an exception handler, the supervisor agent will be notified and receives the class ID of the exception. However, if either the target application program does not catch the exception or does not use any of these methods on the thrown exception, the supervisor agent 202 will not be notified and JAS will not handle this event.

If a thread start event occurs and the supervisor agent determines that the spawned thread would exceed a soft or hard limit and that the appropriate action for this event is thread suspension, the supervisor agent puts the execution of this thread on hold. Whenever a thread termination event occurs, the supervisor agent 202 checks whether it is safe according to the configuration to resume the execution of any suspended threads and if it is, releases the thread that has been suspended for the longest time.

The supervisor agent 202 also executes a thread and target application program check periodically that determines whether any thread or the entire target application program is hung. The SupervisorInterface class starts the periodic thread check. The check thread is a C++ native method in a Java thread with maximum priority. It transmits the result of the check to the remote manager 205. If the remote manager 205 does not receive a notification from this thread within a certain time interval, it may consider either the communication link to JAS broken or JAS to have silently failed. If the communication link is the problem, JAS will notice this also and attempt to reestablish the connection to the remote manager repeatedly until it either succeeds or considers the communication link to have failed permanently. If JAS has failed silently, it cannot attempt to reestablish the connection to the remote manager and therefore, the remote manager will not receive any connection request from JAS. It is advantageous that if no connection request from JAS is received by the remote manager 205 within the specified time interval, it may decide to create a copy of JAS and the target application program on another machine. This amounts to an automatic failover capability of JAS.

Figure 8:
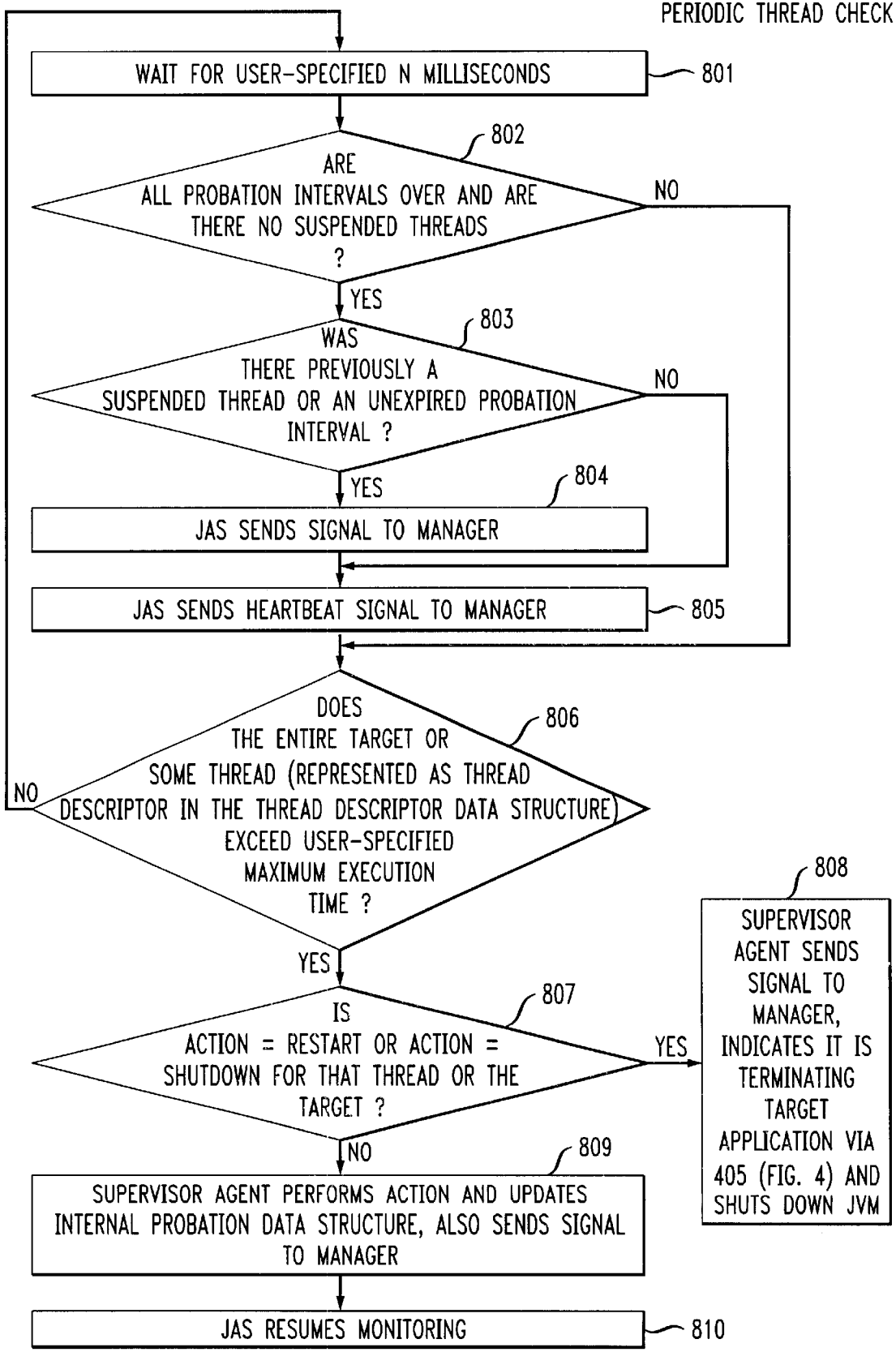
FIG. 8 is a flow chart illustrating the steps in a periodic thread check process.

FIG. 8 is a flow chart illustrating the steps in a periodic thread check method. The thread check method is started in step 801 that causes a wait for a user specified "n" milliseconds. Step 802 tests to determine whether all probation intervals are completed and that there are no suspended threads. If the test result in step 802 is YES, step 803 tests if there was previously a suspended thread or an unexpired probation interval. If the test result in step 803 is YES, step 804 causes JAS to send a signal to remote manager 205 and control is transferred to step 805. If the test result in step 803 is NO, control is transferred to step 805. Step 805 causes JAS to send a heartbeat signal to remote manager 205 and control is transferred to step 806. Returning to step 802, if the test result is NO, control is transferred to step 806. Step 806 tests to determine if the entire target application program or some thread (represented as a thread descriptor in the thread descriptor data structure) exceeds a user specified maximum execution time. If the test result in step 806 is NO, control is returned to step 801 and appropriate ones of steps 801 through 806 are iterated. This iteration continues, so long as, the target application program operates as it is expected to. If step 806 yields a YES result, step 807 tests to determine if action equals restart, or action equals shutdown for that thread or the target application program. If the test result in step 807 is YES, step 808 causes the supervisor agent 202 to send a signal to remote manager 205 indicating that it is shutting down the target application program via step 405 (FIG. 4) and shuts down JVM 208. The signal sent to the manager 205, in this example, is a current status message, which may indicate how many threads are running, the machine the target application program is running on, any problems, etc. If the test result in step 807 is NO, step 809 causes the supervisor agent 202 performs the action and updates the internal probation data structure and also sends a signal to remote manager 205. The signal sent to the manager 205, in this example, is a current status message, which may indicate how many threads are running, the machine the target application program is running on, any problems, etc. Thereafter, step 810 causes JAS to resume monitoring.

FIG. 9 is a flow chart illustrating the steps in an example flow for a performance problem method. The method is started in step 901 in which JAS is notified through JVMPI 212 of the beginning of garbage collector activity and records the current time. In step 902, JAS is notified through JVMPI 212 of the end of the garbage collector activity. Step 903 tests to determine if current time minus recorded time is greater than a user specified maximum garbage collector activity time. If the test result in step 903 is NO, step 904 causes JAS to resume monitoring. If the test result in step 903 is YES, step 905 tests if an action equals restart or the action equals shutdown. If the test result in step 905 is NO, step 906 causes the supervisor agent 202 to perform the action, update the internal probation data structures and also sends a signal to the remote manager 205. The signal sent to the manager 205, in this example, is a current status message, which may indicate how many threads are running, the machine the target application program is running on, any problems, etc. Then, control is transferred to step 904 and JAS resumes monitoring. If the test result in step 905 is YES, step 907 causes the supervisor agent 202 to send a signal to remote manager 205 indicating that it is shutting down the target application program via step 405 (FIG. 4) and shuts down JVM 208.

The above described embodiments are, of course, merely illustrative of the principles of the invention. Indeed, numerous other methods or apparatus may be devised by those skilled in the art without departing from the spirit and scope of the invention.

What is claimed is:

1. Apparatus including an application supervisor for supervising a target application program comprising:
    a supervisor agent;
    a modified application programming interface;
    a generic application wrapper; and
    a shell script,
    wherein said supervisor agent, said modified application programming interface, said generic application wrapper and said shell script operate interactively to detect and automatically resolve reliability and/or performance problems occurring in executing said target application program, whereby this is realized without having a need to either access, modify or have knowledge of the source code of the target application program.

2. The invention as defined in claim 1 further including a virtual machine for executing at least said target application program and at least two virtual machine native interfaces to access said virtual machine for providing notification to said application supervisor of prescribed events occurring during execution of said target application program, and wherein said target application program is accessed through said modified application programming interface.

3. The invention as defined in claim 2 wherein said target application program is in Java programming language, said virtual machine is a Java virtual machine and said native interfaces include a Java virtual machine profiler interface (JVMPI) and a Java native interface (JNI).

4. The invention as defined in claim 3 wherein said supervisor agent in conjunction with said JVMPI, JNI and modified application programming interface detects and/or resolves prescribed events in an executing target application program.

5. The invention as defined in claim 4 wherein said detected prescribe events include at least one or more events from a list including, target application program does not terminate within expected time, thread does not terminate within expected time, garbage collector runs too often, garbage collector runs for too long, number of threads exceeds threshold, Java virtual machine shutdown, number of threads is illegal, e.g., spawning the same thread more than once can indicate a programming bug, hung target application program, i.e., target application program does not terminate within expected time, hung thread, i.e., thread does not terminate within expected time, thread terminates, but is not supposed to terminate, i.e., this is a thread that runs forever, target application program exits with System.exit, thread terminates due to an uncaught exception raised either by the virtual machine or explicitly by the target application program, exception thrown, and caught by the target application program.

6. The invention as defined in claim 4 wherein said detected prescribed events are resolved in at least one or more ways from a list including ignore event, notify said manager, suspend additionally spawned threads if the detected problem is a dangerously high number of threads in the target application program, restart target application program, quit target application program.

7. The invention as defined in claim 4 wherein said shell script at least starts execution of said Java virtual machine, said application supervisor and said generic application wrapper.

8. The invention as defined in claim 7 wherein said shell script further controls shutting down the application supervisor, and supplies appropriate parameters to the application supervisor and said Java virtual machine.

9. The invention as defined in claim 8 wherein said generic application wrapper controls starting up and shutting down said the target application program.

10. The invention as defined in claim 9 further including a configuration file and wherein said generic application wrapper processes said configuration file.

11. The invention as defined in claim 10 wherein said application supervisor is configured by parameterizing a set of policy templates in said configuration file.

12. The invention as defined in claim 11 wherein said application wrapper passes each policy template from said configuration file through calls to native methods to said supervisor agent.

13. The invention as defined in claim 11 wherein each of said policy templates is associated with a specific aspect of reliability or performance of said target application program.

14. The invention as defined in claim 7 further including a prescribed manager and a prescribed transport mechanism for connecting said supervisor agent to said prescribed manager.

15. The invention as defined in claim 14 wherein said prescribed manager visually displays events and/or actions of said executing target application program being supervised.

16. The invention as defined in claim 15 wherein said prescribed manager requests status information on said executing target application program and initiating actions in said application supervisor in response to detected events.

17. The invention as defined in claim 14 further including an application supervisor configuration including thread policy specifications, system policy specifications and manager specifications.

18. The invention as defined in claim 7 further including a configuration manager for creating a default configuration file from prescribed class files comprising the target application program.

19. Apparatus including an application supervisor for supervising a target application program comprising:

supervisor agent means for detecting and/or responding to prescribed events occurring during execution of said target application program;

modified application programming interface means for accessing said target application program;

generic application wrapper means for starting up said target application program;

and shell script means for enabling said target application program to execute, wherein said supervisor agent means, said modified application programming interface means, said generic application wrapper means and said shell script means operate interactively to detect and automatically resolve reliability and/or performance problems occurring in executing said target application program, whereby this is realized without having a need to either access, modify or have knowledge of the source code of the target application program.

20. The invention as defined in claim 19 further including a virtual machine means for executing at least said target application program and at least two virtual machine native interface means for accessing said virtual machine means for providing notification to said application supervisor of prescribed events occurring during execution of said target application program.

21. The invention as defined in claim 20 wherein said target application program is in Java programming language, said virtual machine means is a Java virtual machine and said at least two native interface means includes a Java virtual machine profiler interface (JVMPI) and a Java native interface (JNI).

22. The invention as defined in claim 21 wherein said supervisor agent means in conjunction with said JVMPI and JNI detects and/or resolves prescribed events in an executing target application program.

23. The invention as defined in claim 22 wherein said shell script means includes means for at least starting execution of said Java virtual machine, said application supervisor means and said generic application wrapper means.

24. The invention as defined in claim 23 wherein said shell script means further means for controlling shutting down said application supervisor, and for supplying appropriate parameters to the application supervisor and said Java virtual machine.

25. The invention as defined in claim 24 wherein said generic application wrapper means includes means for controlling starting up and shutting down said the target application program.

26. The invention as defined in claim 25 further including configuration file means for storing prescribed parameters and wherein said generic application wrapper means includes mean for processing said configuration file.

27. The invention as defined in claim 26 wherein said application supervisor is configured by parameterizing a set of policy templates in said configuration file.

28. The invention as defined in claim 27 wherein said application wrapper means further includes means for passing each of said stored policy templates from said configuration file means through calls to native methods to said supervisor agent.

29. The invention as defined in claim 28 wherein each of said policy templates is associated with a specific aspect of reliability or performance of said target application program.

30. The invention as defined in claim 23 further including prescribed manager means for displaying at least status indications of said executing target application program and prescribed transport mechanism means for connecting said supervisor agent to said prescribed manager means.

31. The invention as defined in claim 30 wherein said prescribed manager means includes means for visually displaying events and/or actions of said executing target application program being supervised.

32. The invention as defined in claim 31 wherein said prescribed manager means includes means for requesting status information on said executing target application program.

33. The invention as defined in claim 30 further including an application supervisor means configuration including thread policy specifications, system policy specifications and manager specifications.

34. The invention as defined in claim 23 further including configuration manager means for creating a default configuration file from prescribed class files comprising the target application program.

35. A method for employing an application supervisor for supervising a target application program comprising the steps of:
   detecting of and/or responding to, through a supervisor agent, prescribed events occurring during execution of said target application program;
   accessing through a modified application programming interface said target application program;
   starting up said target application program through a generic application wrapper; and
   enabling said target application program to execute through a shell script,
   wherein said supervisor agent, said modified application programming interface, said generic application wrapper and said shell script operate interactively to detect and automatically resolve reliability and/or performance problems occurring in executing said target application program, whereby this is realized without having a need to either access, modify or have knowledge of the source code of the target application program.

36. The method as defined in claim 35 further including a step executing at least said target application program through a virtual machine and accessing said virtual machine through at least two virtual machine native interfaces for providing notification to said application supervisor of prescribed events occurring during execution of said target application program.

37. The method as defined in claim 36 wherein said target application program is in Java programming language, said virtual machine is a Java virtual machine and said at least two native interfaces include a Java virtual machine profiler interface (JVMPI) and a Java native interface (JNI).

38. The method as defined in claim 37 wherein said supervisor agent in conjunction with said JVMPI and JNI detects and/or resolves prescribed events in an executing target application program.

39. The invention as defined in claim 38 wherein said detected prescribe events include at least one or more events from a list including, target application program does not terminate within expected time, thread does not terminate within expected time, garbage collector runs too often, garbage collector runs for too long, number of threads exceeds threshold, Java virtual machine shutdown, number of threads is illegal, e.g., spawning the same thread more than once can indicate a programming bug, hung target application program, i.e., target application program does not terminate within expected time, hung thread, i.e., thread does not terminate within expected time, thread terminates, but is not supposed to terminate, i.e., this is a thread that runs forever, target application program exits with System.exit, thread terminates due to an uncaught exception raised either by the virtual machine or explicitly by the target application program, exception thrown, and caught by the target application program.

40. The invention as defined in claim 38 wherein said detected prescribed events are resolved in at least one or more ways from a list including ignore event, notify said manager, suspend additionally spawned threads if the detected problem is a dangerously high number of threads in the target application program, restart target application program, quit target application program.

41. The method as defined in claim 38 further including a step of said shell script causing at least starting execution of said Java virtual machine, said application supervisor and said generic application wrapper.

42. The method as defined in claim 41 further including a step of said shell script controlling starting up and shutting down the application supervisor and the target application program, and supplying appropriate parameters to the application supervisor and said Java virtual machine.

43. The method as defined in claim 41 further including a step of storing prescribed parameters in a configuration file and wherein said generic application wrapper processes said configuration file.

44. The method as defined in claim 43 further including a step of configuring said application supervisor by parameterizing a set of policy templates stored in said configuration file.

45. The method as defined in claim 44 further including a step of passing each of said stored policy templates under control of said generic application wrapper from said configuration file through calls to native methods to said supervisor agent.

46. The method as defined in claim 45 wherein each of said policy templates is associated with a specific aspect of reliability or performance of said target application program.

47. The method as defined in claim 41 further including steps of a prescribed manager displaying at least status indications of said executing target application program and a prescribed transport mechanism connecting said supervisor agent to said prescribed manager means.

48. The method as defined in claim 47 further including a step of said prescribed manager visually displaying events and/or actions of said executing target application program being supervised.

49. The method as defined in claim 48 further including a step of said prescribed manager requesting status information on said executing target application program.

50. The method as defined in claim 41 further including an application supervisor configuration including thread policy specifications, system policy specifications and manager specifications.

51. The invention as defined in claim 41 further including a step of creating a default configuration file from prescribed class files comprising the target application program.

* * * * *